United States Patent Office 3,598,635
Patented Aug. 10, 1971

3,598,635
PLASMA SPRAYING PROTECTIVE COATING ON REFRACTORY
Gerald J. Sagona, Painted Post, N.Y., assignor to Corning Glass Works, Corning, N.Y.
No Drawing. Filed Feb. 24, 1969, Ser. No. 801,753
Int. Cl. B44d 1/50, 1/097
U.S. Cl. 117—93.1PF                6 Claims

ABSTRACT OF THE DISCLOSURE

Formation of impervious, continuous, adherent, metallic coating on the surface of a refractory by plasma flame spraying thereon a substantially 20 to 44 microns sized powder of platinum or platinum base alloy at a velocity of at least 100 feet per second and heating the spray coated refractory to a temperature of at least 1250° C. Plasma gas can be mixture of 3–10%, by volume, hydrogen and balance argon and/or nitrogen. Coated refractory useful as structure that is to contact molten glasses or other hot substances that chemically react with the refractory but not with the metallic coating.

BACKGROUND OF THE INVENTION

The invention relates to forming a platinum or platinum base alloy coating on a surface of a refractory so as to protect against reactions between the refractory and molten glasses or other hot substances that are to contact a structure formed of the refractory. Specifically, the invention is concerned with making such coating impervious, continuous and inherent to the refractory surface by a process that includes plasma flame spraying a powder of the metallic coating material directly onto such surface. The terms "refractory" and "platinum base alloy" are used herein, according to their art-recognized and well established definitions, as meaning, respectively, a body of typically nonmetallic structural material (e.g. ceramic or crystalline metallic oxide composition) suitable for use at high temperatures and an alloy containing more than 50%, by weight, platinum.

British patent specification 1,057,981 discloses that the old procedure of combustion flame spraying a wire or molten stream of platinum or platinum base alloy can be done at sufficiently high velocity to provide a metallic coating on an irregular (i.e. porous and/or roughened) surface of a refractory that is not only tenaciously adherent, but also continuous and impervious.

The availability of a substantial supply of platinum and platinum base alloy in powdered form has created a need for a suitable method of using such powder to form the impervious, continuous, strongly adherent coating suitable for protecting against reactions between the underlying refractory and high temperature substances contained by the composite structure, e.g. the reaction between molten glass and the refractory that produces detrimental blisters and seeds (gas bubbles) in the molten glass. Generally, the old procedure of combustion flame spraying powder is deemed unsuitable for powders of high melting point metals and alloys (e.g. platinum) because of the typically prevalent strong tendency of producing combustion flame sprayed powder coatings with discontinuities, very substantial permeable porosity and, in the case of the high melting point metallic powders, weak adherence. Such tendency is particularly aggravated in the case of the high melting point metallic powders by the typically limited heating rate capacity of such procedures, which has usually necessitated a compromise of relatively low spray particle velocity in order to provide more time in the flame for heating the particles up to high temperature. Thus, for the high melting point metallic powders, a suitable compromise is generally deemed not attainable for yielding coatings that are impervious, even after subsequent high temperature consolidation heat treatment, to reactions between materials, such as molten glass and the underlying refractory.

Coatings made the platinum or platinum base alloy powders by plasma flame spraying are usually strongly adherent and of fairly high density (i.e. low porosity) because of the relatively higher spray particle velocities and heating rate capacities possible with such procedure. Nevertheless, prior to the present invention, plasma flame sprayed coatings of platinum or platinum base alloy powders, selected as ordinarily suitable to yield low porosity, were found to be sufficiently pervious, permeable and/or discontinuous to permit reaction between the underlying refractory and molten glass that produced blisters and seeds in the molten glass. Subsequent high temperature consolidation heat treatments gave erratic, inconsistent densification results, including continued permeability that permitted the above noted detrimental blistering reaction.

SUMMARY OF THE INVENTION

By trial and error experimentation, I have discovered the process of the present invention whereby the aforementioned permeability problem with plasma flame sprayed coatings of platinum or platinum base alloy powders, sprayed directly onto a surface of a refractory, are overcome. I found that the plasma flame sprayed coating could be made impervious and impermeable to reactions, such as that between the underlying refractory and molten glass in contact with the exposed coating surface, by utilizing the necessary spray velocity of at least 100 feet per second and by modifying the plasma flame spraying process to include the following two essential, critical steps:

(1) Prior to spraying, sizing the powder that is to be sprayed to be substantially composed of particles having sizes in the range of 20 to 44 microns, and (2) Subsequent to spraying, heating the coating on the refractory to a temperature of at least 1250° C.

While a small amount of the powder may be particles of sizes that deviate somewhat from the above-noted limitations (mainly smaller) without very noticeable effect on imperviousness, generally at least 90%, by weight, of the powder should be particles of sizes in the specified range for assurance of attaining an impervious coating upon completion of the essential process steps.

As was the case with combustion flame spraying wire of platinum or platinum base alloy to form a tenaciously adherent bonding of the coating to the refractory, the surface of the refractory to be coated by the present invention process should be irregular either by virtue of having customary porosity and/or by being roughened (e.g. by grit blasting). It is not necessary that the surface be in a preheated condition at the time spraying is started. Satisfactory results are obtainable by spraying onto a surface initially at room temperature. However, if grit blasting is performed, it is desirable to thoroughly clean the blasted surface of any loose particles or grit or refractory, e.g. by using soap and water and brushing vigorously. Moisture present from the cleaning operation should be removed prior to spraying and preferably by an air blast and/or by slightly heating the refractory to accelerate evaporation.

The improved process can be carried out with any suitable plasma flame spraying device, such as those described in U.S. Pats. 2,922,869 and 2,960,594 and in the Flame Spray Handbook, Volume III—Plasma Flame Process, published 1965 by Metco Inc., Westbury, N.Y. While the plasma gas may be any gas conventionally employed or found suitable for that purpose, particularly good results have been secured according to the present invention where the plasma gas has been a mixture of 3 to 10%, by volume, hydrogen and the balance being argon and/or nitrogen.

Generally, the final heating step to densify the sprayed coating to a state of impermeability to reactions, as previously described, should be carried out at a temperature that does not adversely affect the refractory and ordinarily below the incipient melting point of the sprayed powder coating to avoid problems of flow or distortion of the coating. Desirably, the maximum temperature is 1500° C. and the temperature range found generally preferable (particularly for platinum) is 1400° to 1450° C.

The exposed surface of the finished coating has a typical matte finish. For those applications where the roughness of this matte finish gives undesirable effects (e.g. to the surface of molten glass being formed into glassware), it can be smoothed by suitable grinding and polishing.

British patent specification 1,057,981 sets forth exemplary types of refractories and of platinum base alloys that can be employed in the present invention when desired. Such refractories are mullite, alumina, zirconia, beryllia, chromite, forsterite, kyanite, fire clay, zircon, magnesia spinel, titania, cassiterite, barium oxide, silica, magnesia, thoria and chromic oxide; however, practically any other refractory (in any of the usual forms such as sintered, dried chemically bonded or fusion cast) desired for a particular situation can also be used, e.g. sintered sillimanite for structures to contain molten glass. The noted exemplary platinum base alloys are those containing rhodium, nickel, gold, iridium and palladium (see, for example, U.S. Pats. 2,031,083 and 2,361,578).

DESCRIPTION OF THE PREFERRED EMBODIMENTS

Example 1

Blocks of commercial sintered alumina refractory were prepared for coating by grinding their surfaces to a 50–60 R.M.S. finish and then blasting those surfaces with #36 grit aluminum oxide to a 200–300 R.M.S. roughened finish. Next, the blocks were washed by vigorous brushing with soap and water to remove all loose particles left on the surfaces by the preceding steps. After rinsing with water, the blocks were partially dried with a blast of air, and then drying was completed by heating up to and holding at 260° C. for an hour, after which the blocks were cooled to room temperature.

The dry, roughened surfaces were plasma flame sprayed with a platinum powder, at least 90% by weight of which was particles with sizes ranging from 20 to 44 microns, at velocities of 100 to 200 feet per second by means of a commercial, powder type, plasma flame spray gun sold under the trade designation Type 2MB by Metco Inc. of Westbury, N.Y. Spraying was effected at a distance of about six inches from the sprayed surface and at a rate of about 4.5 to 6 pounds per hour, using argon as the main part of the plasma gas at a pressure of about 100 p.s.i. and a flow rate of about 100 cu. ft./hr., using hydrogen as the powder carrier gas (i.e. remaining part of the plasma gas) at about 50 p.s.i. and a flow rate of about 4.5 to 5 cu. ft./hr., and using arc current of approximately 300 amperes at about 60 volts.

The resultant coatings had thicknesses of approximately 4 to 5 mils, were strongly adherent to the surfaces of the blocks and had densities of about 85–90% of theoretical.

Some of these coated blocks were heated at a temperature in the range of 1250°–1500° C. for up to 24 hours in air atmosphere and then cooled to room temperature. These heat treated coatings had densities of least about 99% of theoretical.

Both types of coated blocks (i.e. with and without heat treatment) were positioned in a furnace with molten soda-aluminosilicate glass at 1250° C. in static contact with the exposed surfaces of the platinum coatings. The glass had the following typical composition on a weight basis: 61.4% $SiO_2$, 16.8% $Al_2O_3$, 12.7% $Na_2O$, 3.6% $K_2O$, 3.7% $MgO$, 0.2% $CaO$, 0.8% $TiO_2$ and 0.8% $As_2O_3$. After 62 hours of such contact, the coated blocks without heat treatment had produced a considerable number of blisters and seeds in their contacting glass. In contrast, the glass on the heat treated blocks did not contain any blisters or seeds after 7 days of contact with the coatings while at 1250° C.

The critical nature of the powder particle sizing of the present invention is pointed up by the following observations. The procedure of Example 1 was repeated on blocks of the same commercial sintered alumina refractory except that the platinum powder used was composed of slightly over 50%, by weight, particles having a size distribution ranging from 30 to 60 microns and the balance being particles with sizes ranging substantially from 20 to 30 microns (i.e. no more than about 10% by weight of the powder being less than 20 microns). This coarser powder yielded plasma flame sprayed coatings with densities of only about 75–85% of theoretical in the as-sprayed state and not much greater than about 85% of theoretical in any heat treated state. Thus, even the heat treated coatings made with the coarser powder would not prevent the blistering reaction upon contact with the molten glass. At the other extreme, a platinum powder with a larger fine fraction was substituted in the procedure of Example 1 and this powder was composed of 28% by weight particles with sizes less than 20 microns and the balance particles with sizes ranging from 20 to 60 microns. The spraying of this powder was highly erratic and gave a spotty or considerably discontinuous coating leaving substantial areas of the refractory surface uncoated.

Example 2

The procedure of spraying and heat treatment in Example 1 was repeated with additional blocks of the same commercial sintered alumina refractory. The exposed coating surfaces of these blocks were placed in contact with a flowing mass of the same molten soda-aluminosilicate glass at 1500° C. for 7 days. At the end of this test, no blisters or seeds were observed in the glass, thereby indicating the impervious nature of the coatings.

Example 3

Blocks of the commercial sintered alumina refractory and of a commercial sintered sillimanite refractory were prepared, coated and heat treated as in Example 1. The exposed coating surfaces of these blocks were placed in contact with a static mass of molten borosilicate glass at 1450° C. for one day and no blisters nor seeds were present in the contacting glass at the end of this test. The glass had the following typical composition on a weight basis: 79.8% $SiO_2$, 12.2% $B_2O_3$, 2.8% $Al_2O_3$, 4.0% $Na_2O$, 0.4% $K_2O$ and 0.8% $CaO$.

Example 4

An orifice ring of a commercial sintered zircon refractory had its inner annular surface prepared, coated and heat treated as in Example 1. The heat treatment was at 1400°–1450° C. Approximately 212,000 pounds of molten borosilicate glass (as described in Example 3) at 1450° C. was flowed through the coated orifice ring over a ten day period without forming any observable blisters or seeds in that glass and without producing any adverse effect on the platinum coating, which was strongly adherent to the zircon body.

Any of the usual platinum base alloys employed for contacting molten glass, e.g. 10% by weight rhodium and 90% by weight platinum, can be made into suitably sized powder and substituted in any one or more of the preceding examples to provide substantially the same results as noted above.

I claim:
1. The method of coating a refractory by plasma flame spraying a powder of metallic material selected from platinum and platinum base alloys directly onto a surface of the refractory at a velocity of at least 100 feet per second, wherein the improvement comprises:

prior to spraying, sizing said powder to be substantially composed of particles having sizes in the range of 20 to 44 microns, and heating the resultant coating on said surface to a temperature of at least 1250° C. but below the incipient melting point of said material forming said coating to densify the coating to an impervious state.

2. The method of claim 1 wherein the plasma gas employed for producing the plasma flame is a mixture of 3 to 10%, by volume, hydrogen and the balance being selected from argon and nitrogen.

3. The method of claim 1 wherein the coated refractory is heated to a temperature that does not exceed 1500° C.

4. The method of claim 3 wherein said temperature is in the range of 1400° to 1450° C.

5. The method of claim 4 wherein the refractory is substantially composed of zircon and the metal is platinum.

6. The method of claim 5 wherein the plasma gas employed for producing the plasma flame is a mixture of 3 to 10%, by volume, hydrogen and the balance being selected from argon and nitrogen.

References Cited
UNITED STATES PATENTS

| | | | |
|---|---|---|---|
| 2,370,242 | 2/1945 | Hensel et al. | 29—182 |
| 3,289,291 | 12/1966 | Reed | 106—1X |
| 3,372,054 | 3/1968 | Wishnie et al. | 117—105.2 |
| 3,375,127 | 3/1968 | Mellor | 117—93.1 |

ALFRED L. LEAVITT, Primary Examiner

E. G. WHITBY, Assistant Examiner

U.S. Cl. X.R.

117—22, 123B, 160R; 29—192; 65—18, 32, 59, 60, 374; 106—1